United States Patent [19]
Young

[11] 4,414,055
[45] Nov. 8, 1983

[54] MACHINE FOR APPLYING BASE CUPS TO BOTTLES

[75] Inventor: William P. Young, Farmington, Mich.

[73] Assignee: William P. Young Co., Farmington, Mich.

[21] Appl. No.: 159,127

[22] Filed: Jun. 13, 1980

Related U.S. Application Data

[62] Division of Ser. No. 103,566, Dec. 14, 1979, Pat. No. 4,312,439.

[51] Int. Cl.³ ............................................. B29D 3/00
[52] U.S. Cl. ............................ 156/423; 156/294; 156/556; 156/566; 156/567
[58] Field of Search ............. 156/293, 294, 303.1, 156/423, 556, 566, 567, 69

[56] References Cited
U.S. PATENT DOCUMENTS

| | | | |
|---|---|---|---|
| 707,738 | 8/1902 | Warren | 156/566 |
| 2,156,811 | 5/1939 | Goodwin et al. | 156/69 |
| 3,316,135 | 4/1967 | Brown et al. | 156/69 |
| 3,959,065 | 5/1976 | Ashcroft | 156/423 |
| 4,132,584 | 1/1979 | Aidlin et al. | 156/578 |
| 4,300,966 | 11/1981 | Hoffmann | 156/293 |
| 4,308,086 | 12/1981 | Valyi | 156/423 |

*Primary Examiner*—Michael G. Wityshyn
*Attorney, Agent, or Firm*—Barnes, Kisselle, Raisch, Choate, Whittemore & Hulbert

[57] ABSTRACT

A machine for applying flat-bottomed base cups to round-bottomed plastic bottles. The machine comprises an orbiting conveyor having means for carrying a plurality of bottles and base cups along a predetermined path during which time the base cups are applied to the bottom of the bottles. A bottle loader mechanism is provided for receiving a plurality of bottles directly from a blow-molding machine and transferring the same directly and simultaneously to the conveyor. Means are provided for delivering base cups single file to the conveyor and for removing the bottles from the conveyor after the base cups have been applied.

9 Claims, 17 Drawing Figures

MACHINE FOR APPLYING BASE CUPS TO BOTTLES

This is a division, of application Ser. No. 103,566, filed Dec. 14, 1979 now U.S. Pat. No. 4,312,439.

This invention relates generally to a machine for applying base cups to bottles and refers more particularly to a machine for applying flat-bottomed base cups to round-bottomed plastic bottles.

BACKGROUND AND SUMMARY OF THE INVENTION

Blow-molded bottles of thermoplastic synthetic resinous material are, for unavoidable reasons, produced with round bottoms and it is, therefore desireable to apply flat-bottomed base cups to the bottles so that they will stand up. One machine for applying flat-bottomed base cups to bottles with round bottoms is disclosed in U.S. Pat. No. 4,132,584.

One object of this invention is to provide an improved machine for applying flat-bottomed base cups to round-bottomed bottles.

More specifically, it is an object of this invention to provide such a machine with a loader mechanism adapted to transfer a plurality of bottles received from the blow-molding machine directly and simultaneously to an orbiting conveyor on which the base cups are applied to the bottles. The plastic bottles are formed in a well-known manner several at a time in the chambers of a blow-molding machine from which they are deposited on the loader mechanism.

The loader mechanism in the specific embodiment about to be described is a pivoted structure adapted to swing about a horizontal axis to transfer several bottles simultaneously to the orbiting conveyor.

Another object of the invention is to provide a machine in which the base cups are applied to the bottles automatically in response to the movement of an orbiting conveyor, preferably by means of a cam rail located beneath the conveyor.

Another object is to provide a machine in which an orbiting conveyor supports a plurality of support units of novel construction each comprising a bottle holder and a base cup seat beneath the bottle holder.

Another object is to provide a machine having novel means for moving a line of base cups to an orbiting conveyor on which the base cups are applied to the bottles and simultaneously for carrying away the bottles after the base cups have been applied.

BRIEF DESCRIPTION OF THE DRAWINGS

Other objects and features of the invention will become more apparent as the description proceeds especially when considered with the accompanying drawings, wherein.

DETAILED DESCRIPTION

Figure 1:
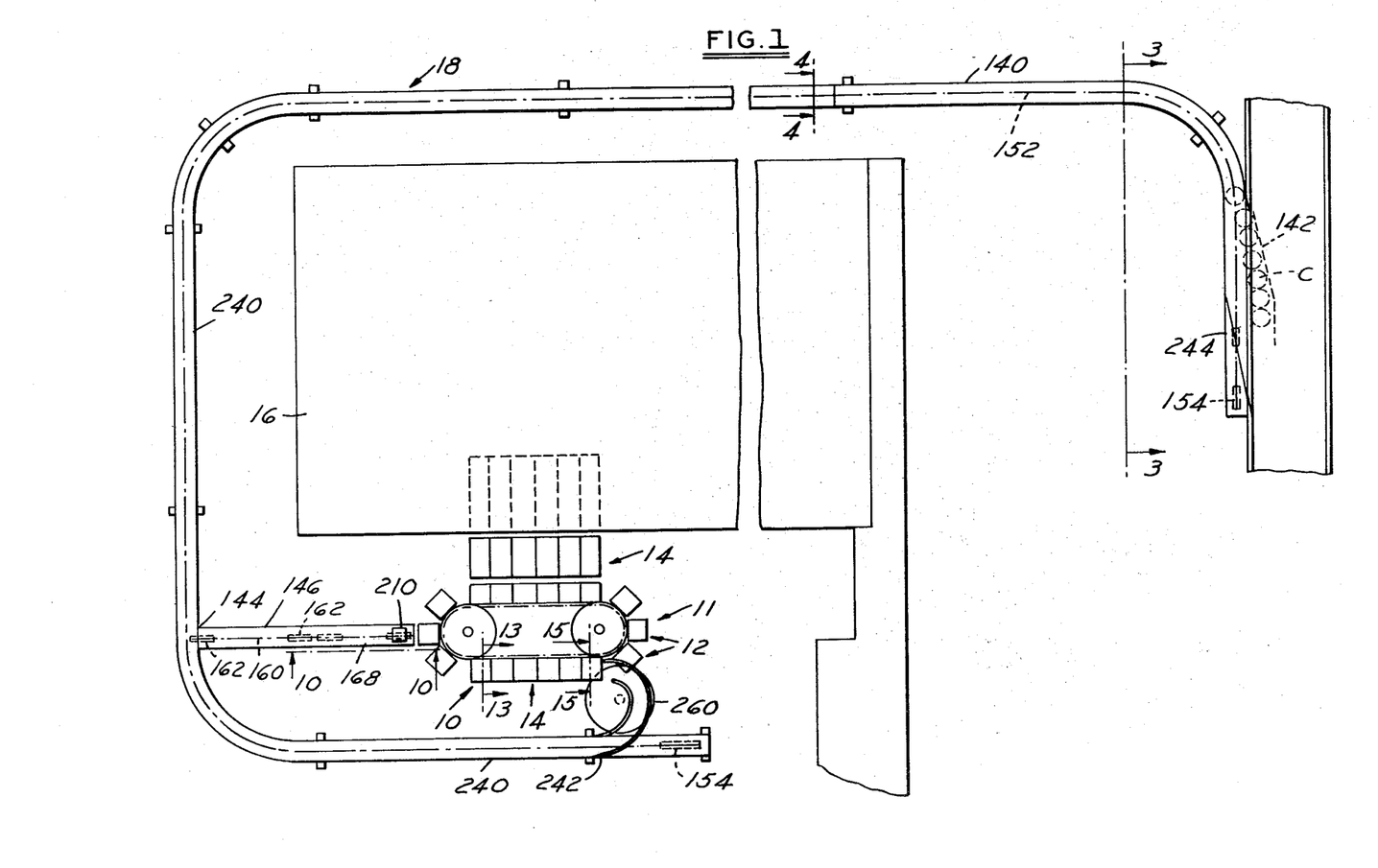
FIG. 1 is a semi-diagrammatic top plan view of apparatus embodying the invention.

Referring now more particularly to the drawings and especially to FIG. 1 thereof, the apparatus comprises a machine 10 having an orbiting conveyor 11 provided with individual support units 12 on which the bottles and base cups are assembled, a loader mechanism 14 for receiving bottles B from the blow-molding machine 16 and transferring them directly and simultaneously to the conveyor, and track and conveyor means 18 for advancing base cups C in a line to the orbiting conveyor 11 and for carrying away the bottles after the base cups have been applied.

The bottles B are preferably of a thermoplastic resinous material blow-molded in the general form illustrated in the drawings, each having a cylindrical main body portion 13 and a neck portion 15 of reduced diameter which is threaded at the top and has an annular collar 17 beneath the threading. The bottom 19 of the bottle is rounded to an extent such that the bottle is not capable of standing alone.

The base cups C are preferably formed of a suitable thin-walled flexible plastic material having a bottom wall 21 and an annular side wall 23 which is of a diameter corresponding to that of the lower end of the body portion of the bottle where such body portion begins to curve and merge into the round bottom portion of the bottle. The bottom wall of the base cup preferably has a raised ring portion 25 providing a seat adapted to be engaged by and to support the rounded bottom wall of the bottle.

Figure 2:
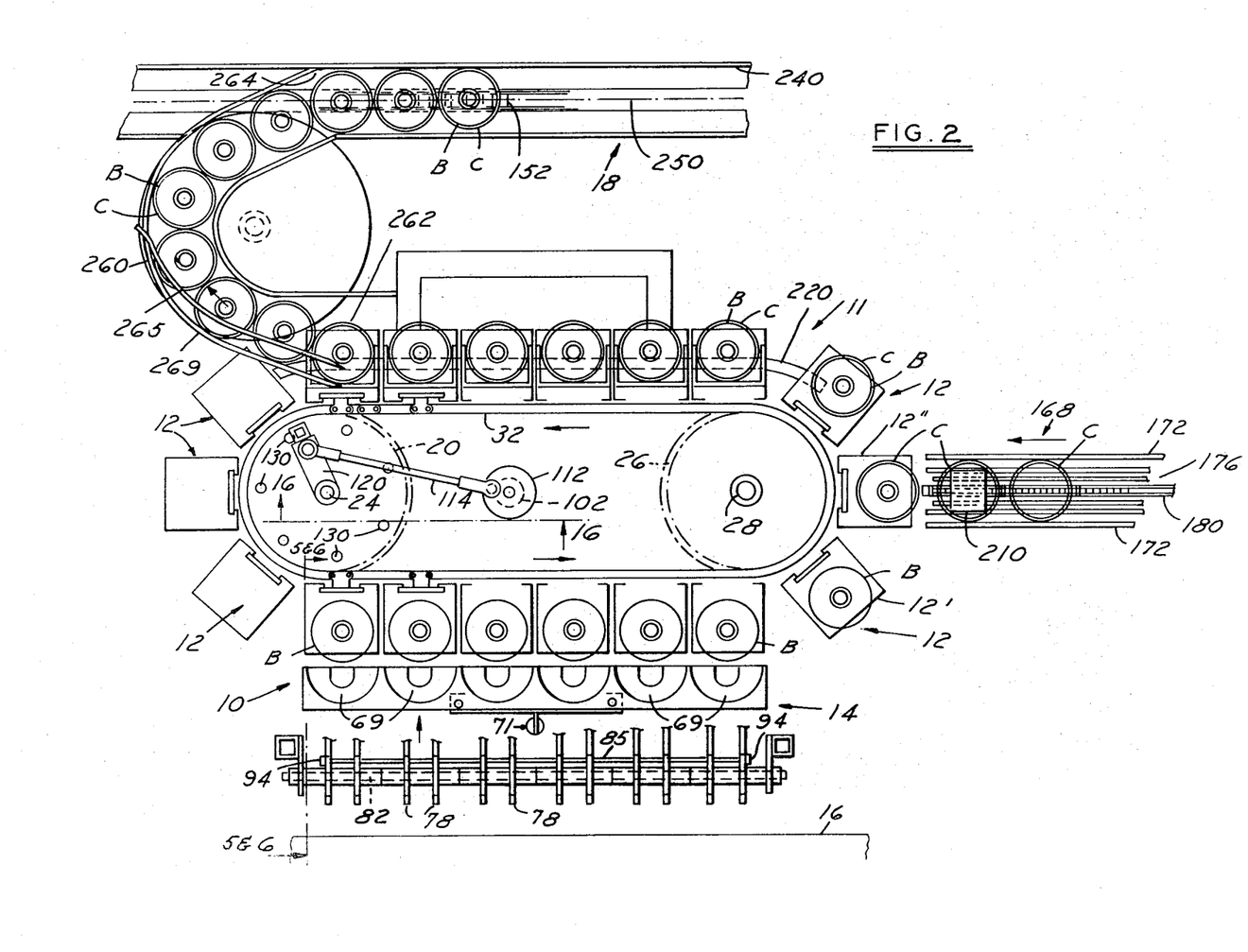
FIG. 2 is an enlarged top plan view of a portion of FIG. 1.
Figures 16, 17:
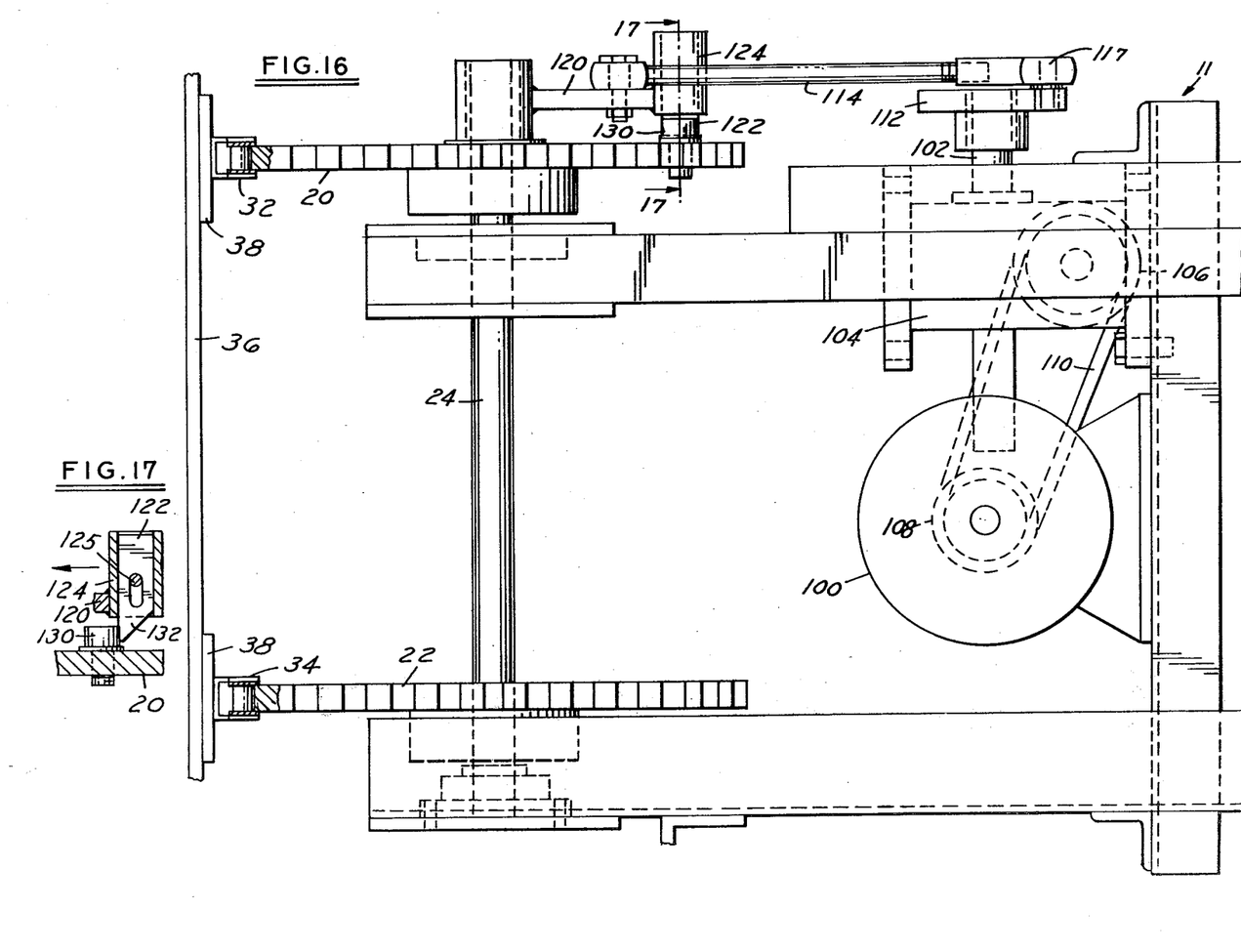
FIG. 16 is a sectional view taken on the line 16—16 in FIG. 2.
FIG. 17 is a sectional view taken on the line 17—17 in FIG. 16.

Referring to FIGS. 2 and 16, the orbiting conveyor 11 comprises upper and lower sprockets 20 and 22 secured on a vertical shaft 24 and upper and lower sprockets 26 and 27 secured on a vertical shaft 28 spaced from shaft 24. These shafts 24 and 28 are rotatably mounted on a frame 30 of the machine. An upper endless chain 32 extends around the upper sprockets 20 and 26 and a lower endless chain 34 extends around the lower sprockets 22 and 27. These chains obviously orbit in vertically spaced horizontal paths when the sprockets turn.

Figure 8:
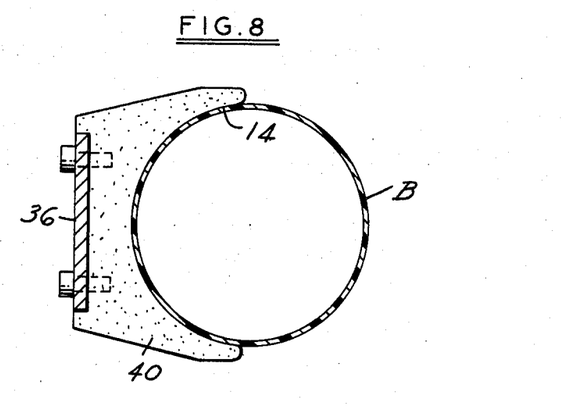
FIG. 8 is a view taken on the line 8—8 in FIG. 6.

A plurality of support units 12 on which the bottles and base cups are assembled are secured to the chains in equally spaced relation around the periphery thereof. Each unit has a vertical base plate 36 secured to the chains by brackets 38. The upper and lower edges of the base plates 36 run in grooves 37 on the frame of the machine to guide them in the orbital path of the conveyor 11. A bottle body holding member 40 is secured to the base plate between the upper and lower ends thereof, and projects horizontally outwardly therefrom, having a semi-circular recess 41 at its outer edge of the same diameter as the body of the bottle to closely receive it in the manner shown in FIG. 8. Member 40 is preferably formed of rubber or a rubber-like material and is adapted to have a friction contact with the body of the bottle.

At the top of each base plate there is secured a bottle neck holding member 42 which extends horizontally outwardly and has an outwardly opening generally U-shaped recess or slot 43 of approximately the same diameter as the neck of the bottle so as to receive the threaded portion of the neck above the collar. Member 42 is preferably formed of metal or other relatively rigid material. A flat neck support pad 44 is secured to the horizontal under surface of the member 42 and is also formed with an outwardly opening generally U-shaped slot 46 which registers with the slot 43 in member 42. This support pad is preferably formed of a flexible rubber or rubber-like material. The width of the slot 46 is substantially equal to or slightly less than the width of the bottle neck beneath the collar so as to closely receive that portion of the neck with a friction grip.

The upper half of the support pad 44 around the three sides of the slot 46 is cut back from the slot to provide a generally U-shaped recess 48 the width of which corresponds to the diameter of the collar 17 on the neck of the bottle. The two legs 50 of the pad on opposite sides of the slot 46 extend outwardly beyond the holding member 42 and are of reduced thickness, the upper surfaces thereof forming continuations of the bottom of recess 48. The adjacent inner edges of the extended portions of the legs 50 flare away from one another in an outward direction and are tapered on their upper surfaces where indicated at 49 to facilitate the entry of the collar of a bottle. These extended portions of the legs 50, being somewhat thinner than the main body portion of the pad, are also somewhat more flexible to assist in the entry of the collar. The inner edges of legs 50 have projections or detents 51 to retain the bottle neck in the slot. The legs 52 of the member 42 on opposite sides of the slot 43 have the inner edges formed with beveled or tapered undersurfaces 54 likewise to facilitate entry of the collar of a bottle. A bottle B is held firmly and precisely upright by the holders 40, 42, and 44 with collar 17 in recess 48.

A base cup holder 53 is supported on the lower end portion of the base plate 36 of each support unit 12 for vertical sliding movement and is adapted to support a base cup C. A pin 58 on plate 36 provides a stop limiting downward movement of base cup holder 53. The base cup holder has a horizontal bottom wall 55 large enough to support a base cup C, a vertical back wall 57 and laterally spaced side walls 59 spaced apart a distance slightly greater than the width of a base cup. The base cup holder is open at the outer side or front and at the top.

The loader mechanism 14 is located opposite a straight line portion of the conveyor 11 as clearly shown in FIG. 2. The loader mechanism is a pivoted structure having a back wall 60 and a bottom wall 62 projecting from the back wall at right angles thereto. This loader mechanism is pivoted for swinging movement on the horizontal axis of pins 64 mounted on a fixed support 66 and engaged by flanges 68 extending beneath the bottom wall of the loader. The loader is divided into six bottle holding compartments or chambers 69 by the parallel walls 70 which are equally spaced apart and extend vertically and at right angles to the back wall and bottom wall of the loader and also to the axis of the pivot pins 64. These chambers 69 are dimensioned to receive bottles B produced in the molding machine 16.

Figure 5:
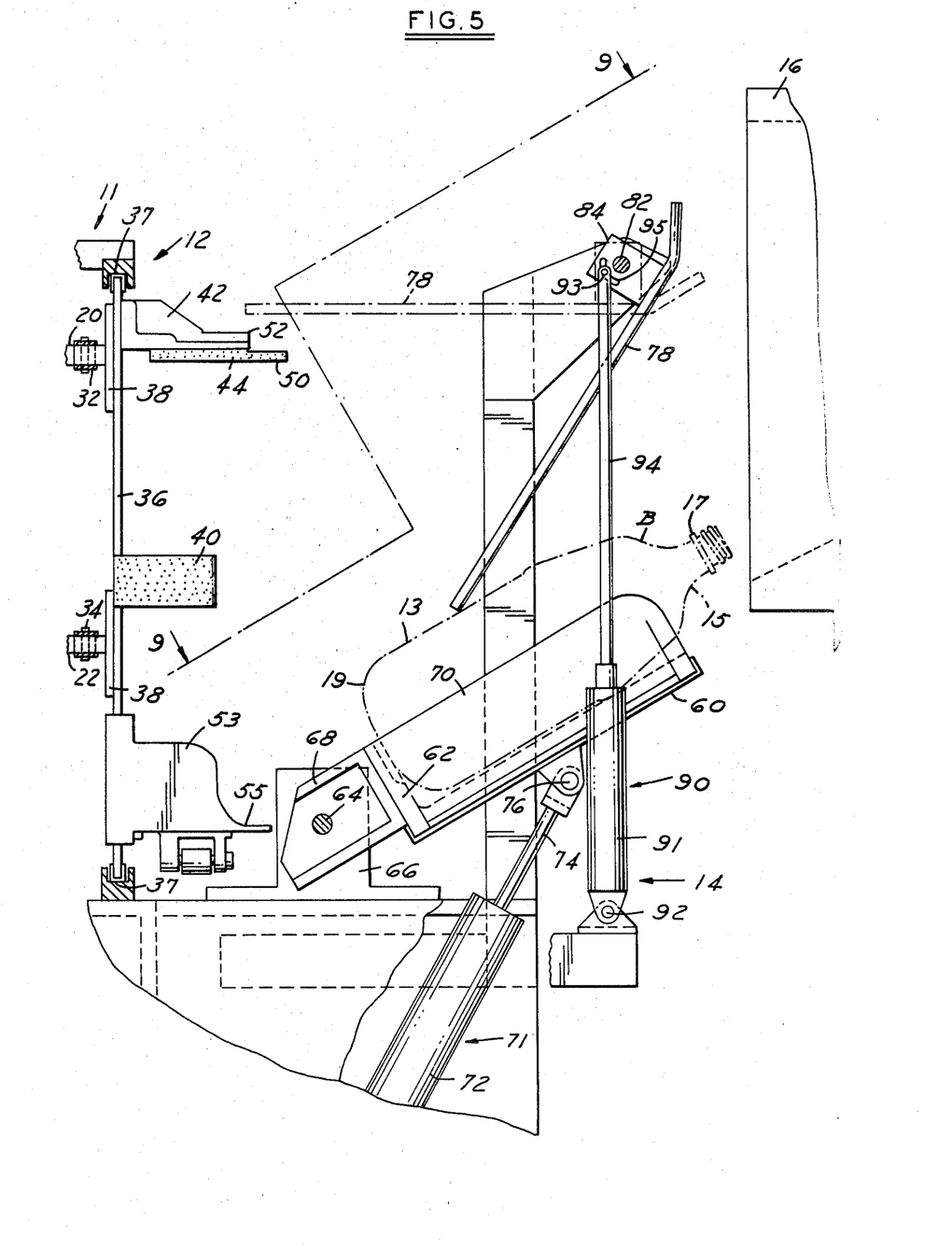
FIG. 5 is a view taken on the line 5—5 in FIG. 2, with parts in section.

FIG. 5 illustrates the loader 14 in its retracted position for receiving bottles directly from the molding machine 16 and for this purpose the tops of the chambers as well as the front thereof adjacent to the conveyor 11 are open. The open front and tops of the chambers also permit the bottles to be transferred to the support units 12 on the conveyor 11 when the mechanism is swung to the solid line position in FIG. 6.

Figure 6:
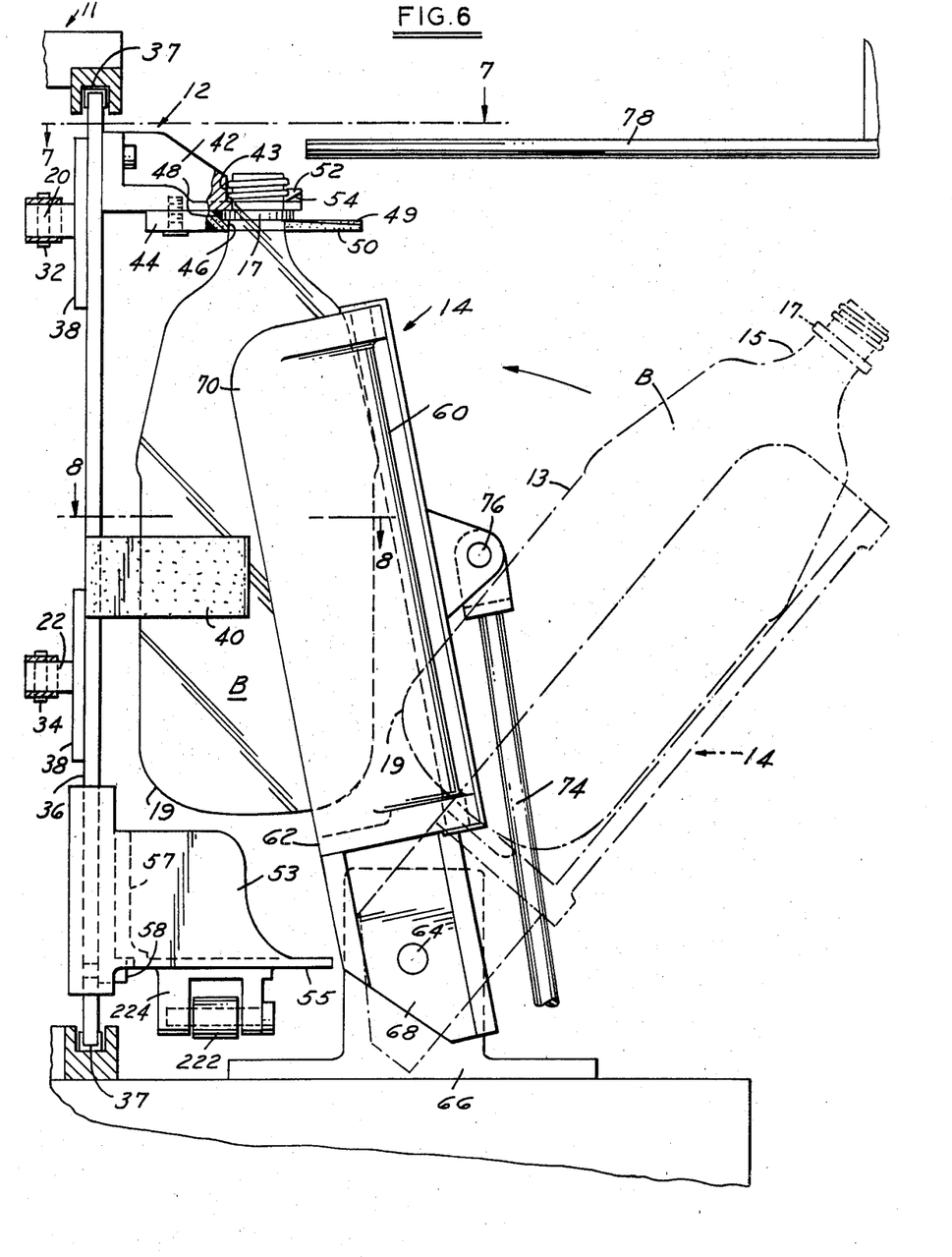
FIG. 6 is a view taken on the line 6—6 in FIG. 2, with parts in section.
Figure 7:
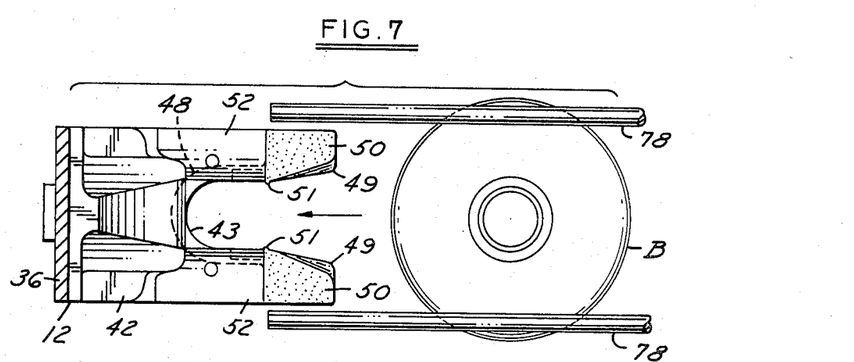
FIG. 7 is a view taken on the line 7—7 in FIG. 6.

A piston-cylinder assembly 71 is provided for swinging the loader mechanism 14 from the withdrawn or retracted position shown in FIG. 5 and in dot-dash lines in FIG. 6 to the solid line position in FIG. 6 for transferring bottles to the conveyor 11. The piston-cylinder assembly 71 is fluid actuated and has a cylinder 72 pivoted on the machine frame at its lower end. A rod 74 extending from the piston (not shown) in the cylinder is pivoted to the rear wall of the loader where indicated.

Figure 9:
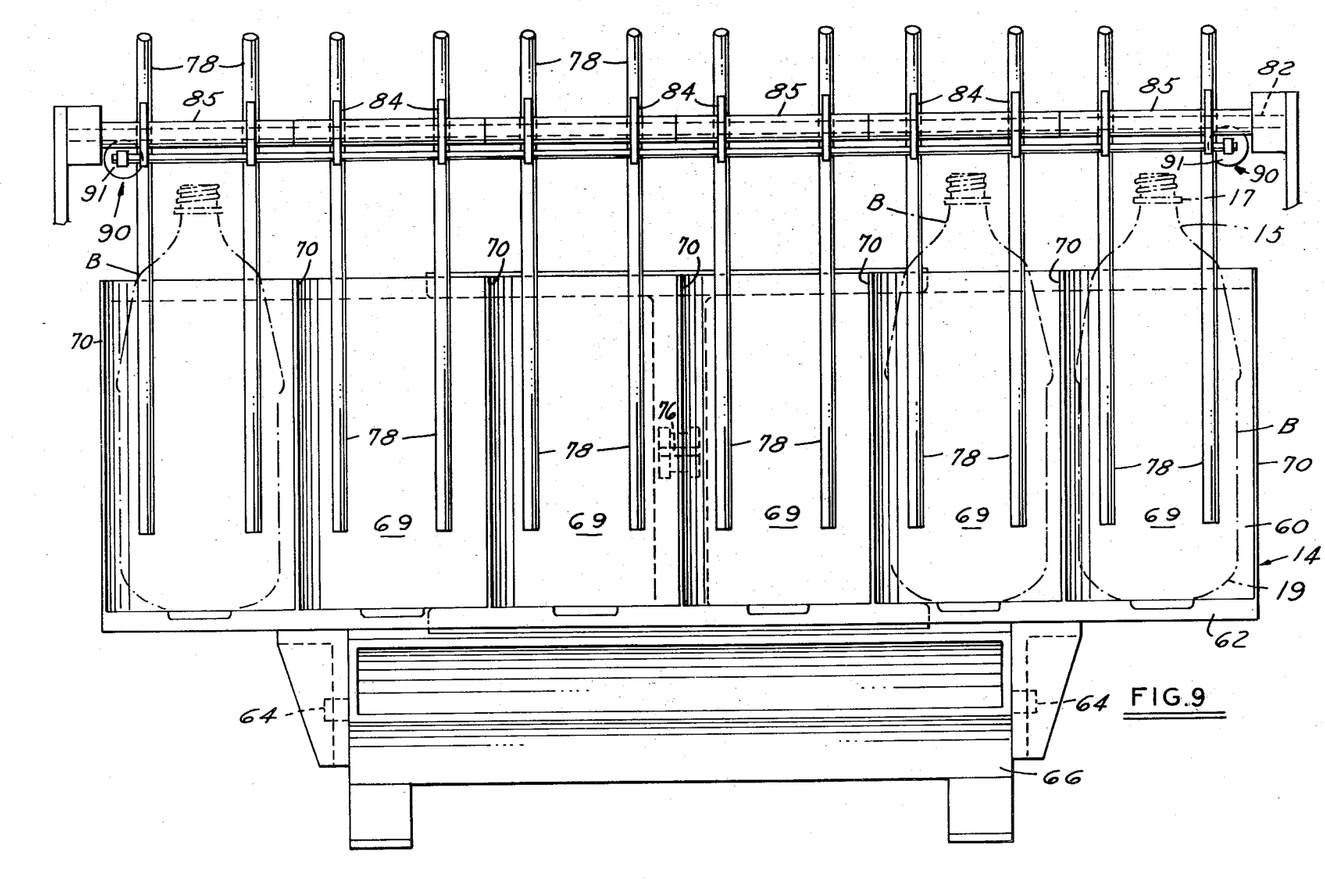
FIG. 9 is a view as seen on the line 9—9 in FIG. 5.

Means are provided for retaining the bottles on the loader 14 prior to transfer to the conveyor 11, such means including the retaining fingers 78 shown in FIGS. 5 and 6. The bottles are of a thin wall, lightweight construction and, if it were not for the fingers, might bounce out of the loader chambers when received from the blow-molding machine. The fingers 78 are distributed in laterally spaced relation along the length of a support rod 82 which extends parallel to the pivot axis of the loader. The fingers are affixed to brackets 84 secured to sleeves 85 which are freely rotatable on rod 82. As shown in FIG. 9, a pair of fingers are positioned over each bottle chamber and each pair is secured to a separate sleeve. The fingers normally rest lightly on the bottles but are retracted to the dotted line position of FIG. 5 by a retracting means including fluid actuated piston-cylinder assemblies 90 prior to transfer of the bottles from the loader to the conveyor. Each cylinder 91 of the assemblies 90 is pivoted to the machine frame as at 92. The piston rods 94 are connected to the ends of a rod 93 which extends through slots 95 in the brackets. The slots 95 are somewhat elongated and curve around the axis of rod 82 to permit slight oscillation of the fingers, independent of the piston-cylinders 90, in both directions from the position shown in FIG. 5, to enable the fingers to more effectively damp or stabilize a bottle as it enters a chamber.

The orbiting conveyor 11 is driven with a step by step motion by a drive which includes the motor 100. The motor 100 is mounted on the frame of the machine and turns an output shaft 102 through gear box 104, pulleys 106 and 108 and a belt 110. A disc 112 is fixed on the output shaft. A connecting rod 114 is pivoted at one end to a peripheral portion of the disc by a pin 117. The other end of the connecting rod is pivoted to one end of the crank arm 120. The other end of the crank arm turns freely on the upper end of the shaft 24 and is oscillated back and forth by the connecting rod as the output shaft 102 rotates. Crank arm 120 as seen in FIGS. 16 and 17 has on its outer end a dog 122 supported in a socket 124 on the crank arm for vertical sliding movement. A pin 125 in the socket extends through a slot in the dog to limit the extent of its vertical movement. The dog is adapted to engage any one of the circular array of lugs 130 around the outer perimeter of the sprocket 22 to turn the sprocket in a counter-clockwise direction during counter-clockwise movement of the crank arm. Upon the return clockwise movement of the crank arm, the bevelled end 132 of the dog 122 will cam over the next lug in the series.

When the motor 100 is running, the conveyor 11 will thus be moved step by step in a counter-clockwise direction. The conveyor 11 in each step of its movement moves a distance equal to the distance between center lines of adjacent support units 12. Between steps when the conveyor 11 is stationary, the support units 12 along the straight line portion of the conveyor path opposite the loader mechanism 14 are directly opposite the bottle chambers, so that when the loader mechanism is actuated, the bottles will be transferred from the chambers of the loader mechanism directly to the bottle holders on the support units. Also when the conveyor 11 is stationary, a support unit 12 is directly opposite the base cup feed mechanism described below.

Figure 3:
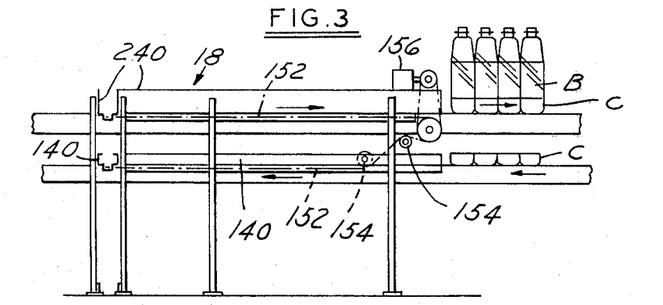
FIG. 3 is as seen on the line 3—3 in FIG. 1.
Figure 4:
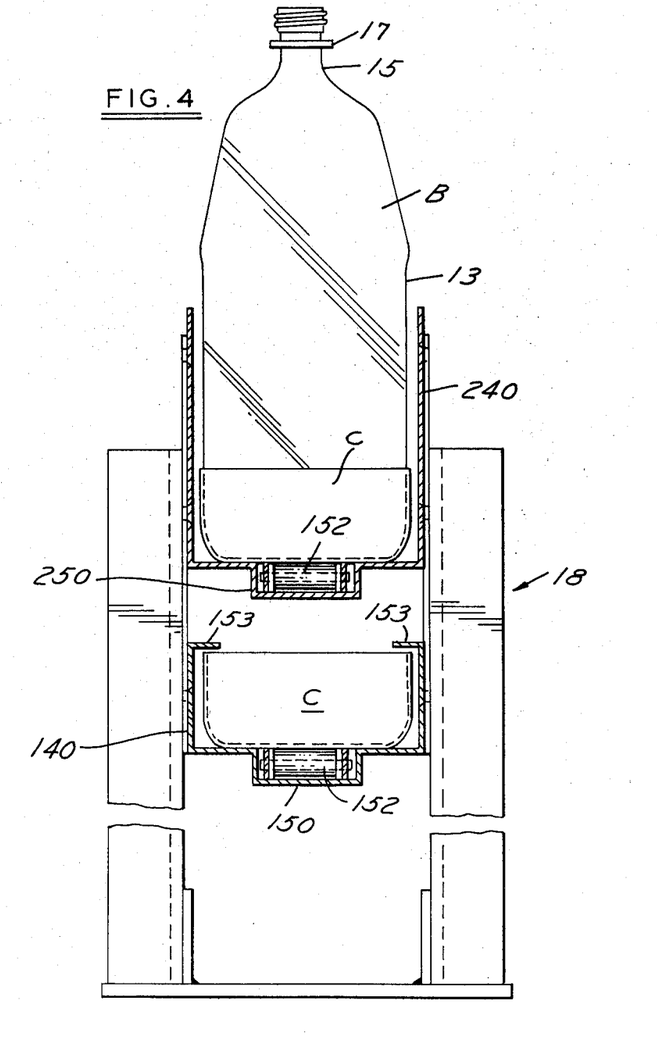
FIG. 4 is an enlarged sectional view taken on the line 4—4 in FIG. 1.

The track and conveyor means 18 includes a track 140 for base cups which as seen in FIG. 1 extends from the loading point indicated at 142 around to the point 144, and from that point there is an extension track section 146 which carries the base cups into a point adjacent one end of the conveyor 11. The track 140 as seen in FIGS. 3 and 4 is of generally channel shape having a width slightly greater than the width of a base cup so that the base cups can be transported single file along the track. The bottom of the track 140 is formed with a recess 150 to accommodate the conveyor element 152, which may, for example, be a belt or chain. Element 152 extends over pulleys or sprockets 154 and is continuously driven by a motor 156. The lower flight of the conveyor element 152 runs in the recess 150 and its upper surface projects above the recess so that the base cups rest lightly thereon and are moved thereby by friction. Flanges 153 on the top walls of the track 140 extend inwardly to retain the base cups.

The extension track section 146 is of a similar cross section. A conveyor element 160 whose top flight runs in a similar recess in the bottom of the track extension section is provided to advance the base cups by friction. Conveyor element 160 extends over pulleys or sprockets 162 driven continuously by a suitable motor.

Figure 10:
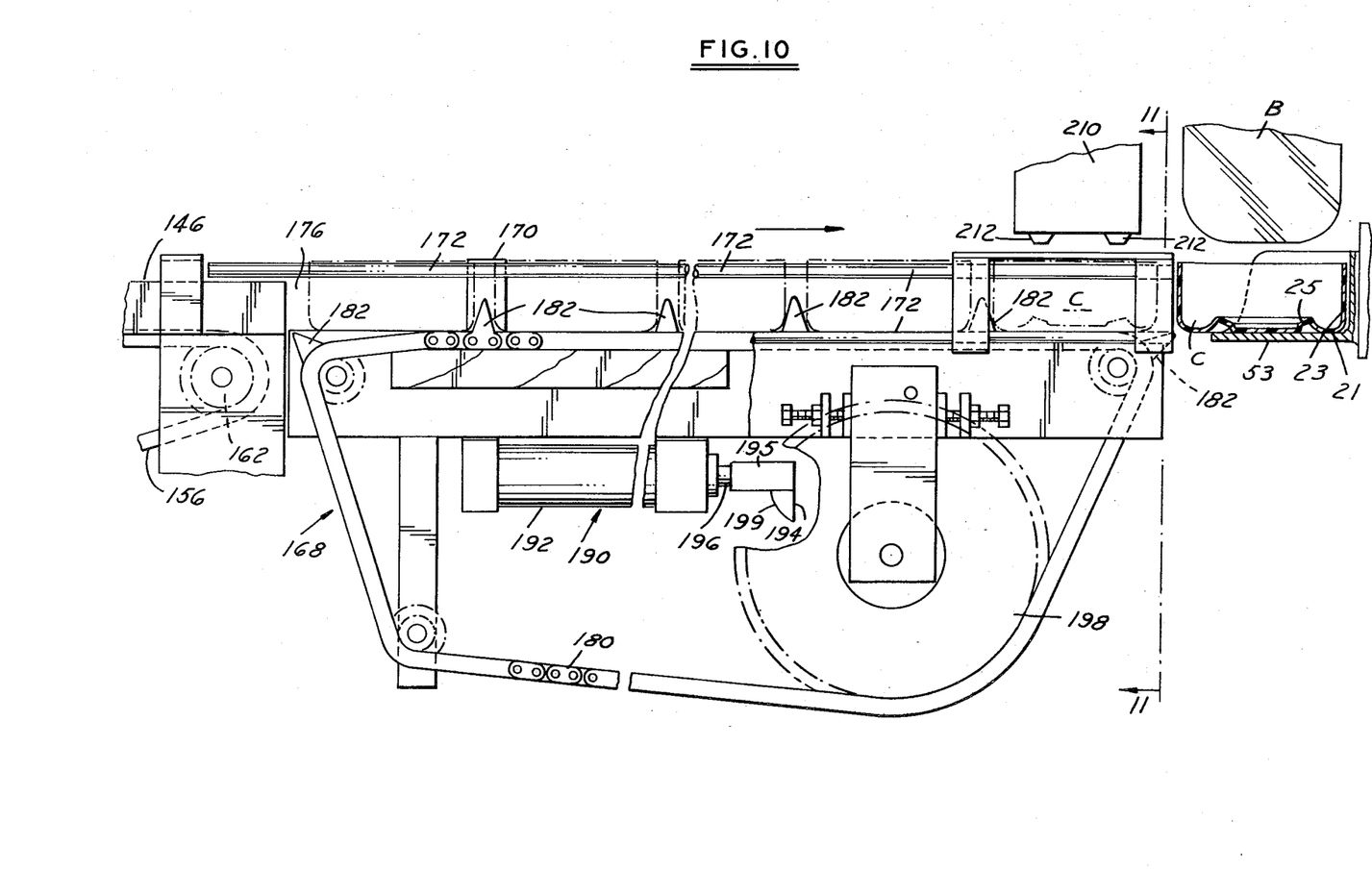
FIG. 10 is a view partly in elevation and partly in section taken on the line 10—10 in FIG. 1.
Figure 11:
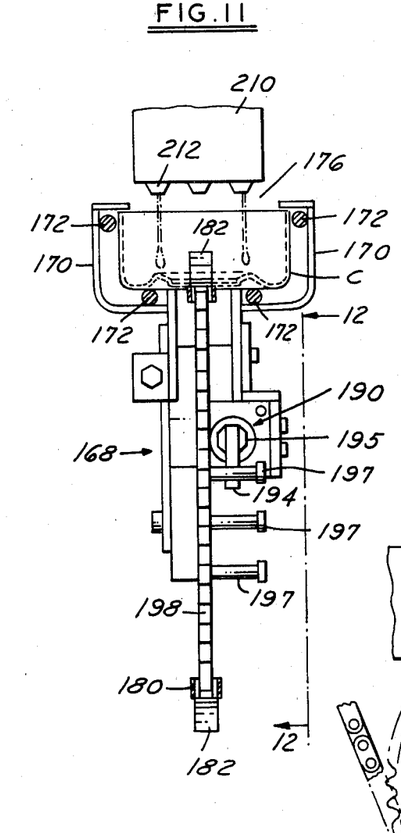
FIG. 11 is a sectional view taken on the line 11—11 in FIG. 10.
Figure 12:
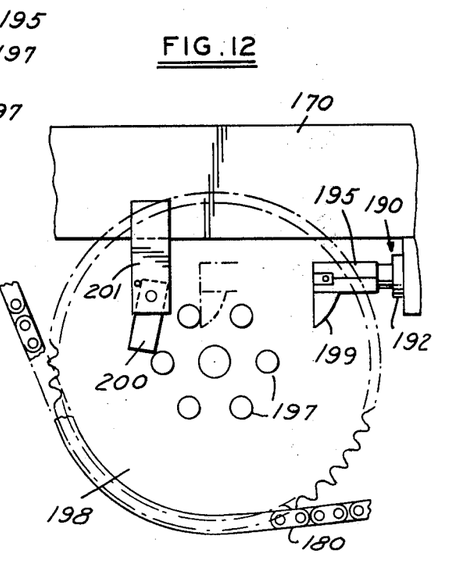
FIG. 12 is a view as seen on the line 12—12 in FIG. 11.

Between the end of the track extension section 146 and the conveyor 11 is a feed mechanism 168 for the base cups best shown in FIGS. 10 and 12 and comprising brackets 170, supporting the parallel rods 172 to provide a track or guide 176 through which the base cups are transferred from the end of the track section 146 to the conveyor 11. The base cups in the feed mechanism 168 are advanced step by step by a conveyor chain 180 which has outwardly projecting driving dogs 182 spaced apart a distance corresponding roughly to the diameter of a base cup. The dogs 182, along the top flight of chain 180 project between the individual base cups on the guide 176 and advance them step by step a distance equal to the distance between dogs which is approximately the width of a base cup. The last cup in the line is transferred to a base cup holder 53 of a support unit 12 on the conveyor.

A fluid actuated piston-cylinder assembly 190 is provided to advance the conveyor belt intermittently or step by step. The assembly 190 has a cylinder 192 secured to the machine frame. The dog 194 is mounted for vertical sliding movement in a housing 195 on the end of rod 196 of the piston (not shown) of the assembly 190. Dog 194 is engageable with the lugs 197 on the sprocket 198, which is one of the sprockets over which chain 180 extends. Lugs 197 are arranged in a circle concentric with the center of the sprocket 198. When the rod of the piston-cylinder assembly 190 is extended, the dog 194 engages one of the lugs to advance the conveyor chain one step. When the rod is retracted, the dog 194, which has a beveled lower end 199, cams over the next lug and will engage and advance the same when the piston rod is again extended. A stop 200, pivoted on a bracket 201 secured to the machine frame, is engageable with the lugs to prevent reverse movement of the chain 180.

There is a glue dispenser 210 located above that base cup C on the feed mechanism 168 which is nearest to the conveyor 11. The glue dispenser contains a supply of a suitable liquid adhesive which is dispensed from outlets 212 on to the raised ring portion 25 of the base cup.

Figure 13:
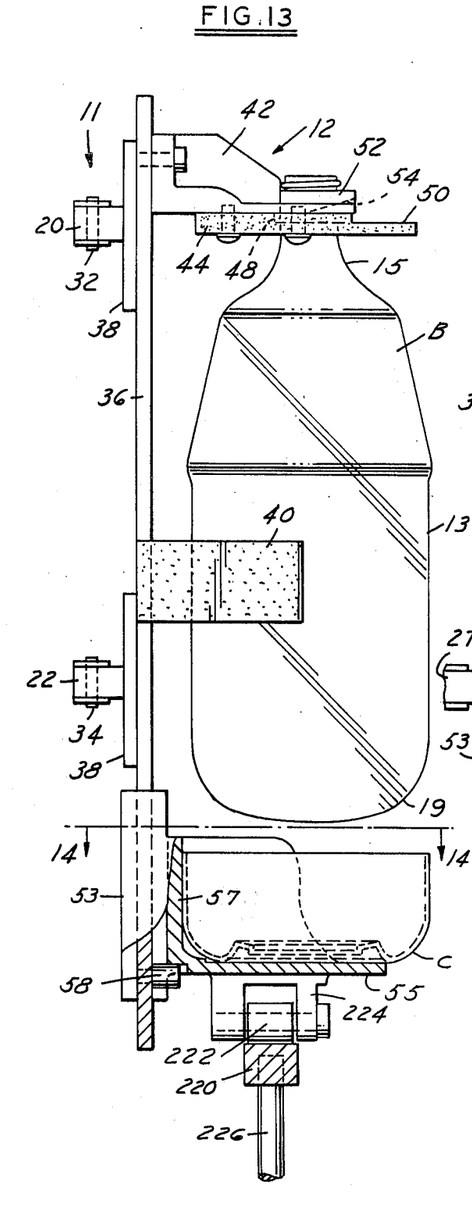
FIG. 13 is a sectional view taken on the line 13—13 in FIG. 1.
Figure 14:
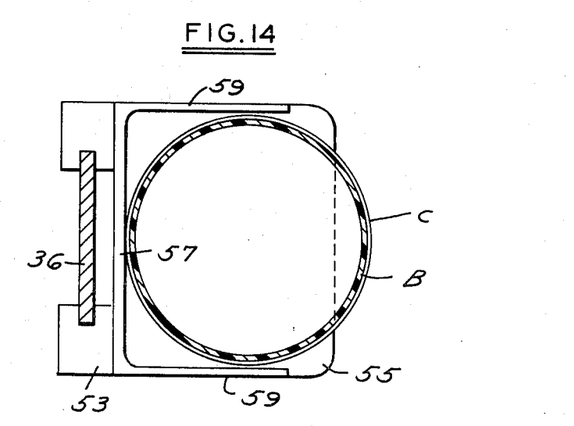
FIG. 14 is a sectional view taken on the line 14—14 in FIG. 13.
Figure 15:
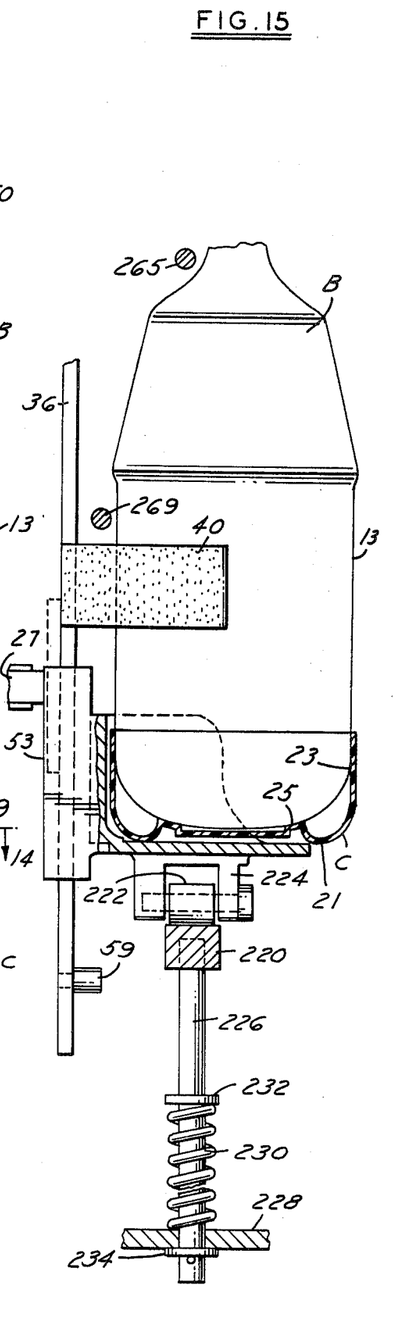
FIG. 15 is a sectional view taken on the line 15—15 in FIG. 1.

Means are provided for elevating the base cup seat 53 of each support unit 12 to apply a base cup seated thereon to the round bottom of a bottle carried by bottle holding members 40 and 42 thereof, such means including a cam rail 220 extending beneath the support units 12 along the straight line portion of the conveyor 11 on the opposite side of the conveyor from the loading mechanism 14. The cam rail 220, best seen in FIGS. 2, 13, and 15 is adapted to engage rollers 222 carried by brackets 224 on the bottoms of the base cup seats 53. FIG. 13 shows the base cup seat in its lowermost position in which it rests upon and engages the stop 58 on the base plate 36 of the support unit 12, at a position in the orbit of the conveyor 11 where the cam rail 220 initially engages the roller 222. The cam rail is inclined upwardly from the position in FIG. 13 to the FIG. 15 position so as to gradually elevate each base cup seat 53 as the conveyor 11 orbits and force the base cup onto the bottom of a bottle with the raised ring portion 25 of the base cup in contact with the bottom of the bottle.

The cam rail 220 is supported at its opposite ends on vertical rods 226 which extend freely through holes in fixed frame member 228. Each rod 226 is held in the operative position shown by means a compression coil 230 which encircles the rod between the upper surface of the fixed frame member 228 and the collar 232 fixed on the rod. Springs 230 press the rods 226 upwardly until fixed collars 234 on the rods engage the undersurface of the frame member 228. Normally the rods 226 remain in this position illustrated in FIG. 15, but if one of the base cup seats should jam, the spring 230 will permit the cam rail 220 to descend and prevent any damage to the equipment.

The track and conveyor means 18 includes a track 240 for the assembled bottles and base cups which as seen in FIG. 1 extends from the point 242 around to the unloading point 224. The track 240 as seen in FIGS. 3 and 4 is of generally channel shape having a width slightly greater than the width of the base cup and bottle so that the assembled base cups and bottles can be transported single file along the track. The bottom of the track 240 is formed with a recess 250 to accommodate the upper flight of the conveyor element 152. The upper surface of the conveyor element 152 projects above the recess 250 so that the base cups on the bottoms of the bottles rest thereon and are moved by the conveyor element by friction.

A track section 260 extends from the orbiting conveyor 11 at the point 262 to the point 264 where it merges into the track 240. A cam rail 265 engageable with the necks of the bottles immediately under the collar thereof separates the bottles from the neck holding members 40,42 and 44 on the support units 12. The cam rail 269 engages the bodies of the bottles immediately above the bottle holding members 40. The two cam rails 265 and 269 separate the bottles from the bottle holding members on the support units 12 of the orbiting conveyor which then are moved along the track section 260 by the pressure of the advancing bottles still remaining on the orbiting conveyor. When the bottles with assembled base cups leave the track section 260 they are picked up by the conveyor element 152 on the track 240 for continued movement to the discharge point 244.

The apparatus will ordinarily be operated with suitable sensing device to initiate the various mechanisms in the desired sequence, although obviously this may be done manually if desired. For example, sensors may be employed to indicate when the six support units 12 along the straight line portion of the conveyor 11 opposite the loader mechanism 14 are empty and also to indicate when the six chambers on the loader have bottles in them. Such sensors may be employed to trigger the operation of the loader mechanism and thereafter the step by step operation of the conveyor 11. Sensors to trigger the operation of the base cup feed mechanism 168 and the glue dispenser 220 may also be employed, positioned between the support units 12' and 12'' in FIG. 1 to sense the transfer from one position to the other of a support unit carrying a bottle.

Assuming that the six support units 12 along the straight line portion of the conveyor 11 opposite the loader mechanism 14 are empty and that the six chambers in the loader are filled with bottles, the loader mechanism may be actuated by first causing the rod of piston-cylinder assembly 90 to be extended to raise the fingers 78 and then causing the rod of piston-cylinder assembly 71 to be extended to turn the loader mechanism 14 from the dot-dash position in FIG. 6 to the solid line position thereof. Thereafter the piston-cylinder assemblies 71 and 90 may be operated in sequence to return the loader mechanism 14 and fingers 78 to the FIG. 5 position. Such operation of the loader mechanism will transfer the bottles on the loader mechanism to the bottle holders on the adjacent support units 12 of conveyor 11, each bottle being held in a friction grip by the slot in the rubber pad 44 and also confined by the neck slot 43 in the holding member 42 and the recess in the body holding member 40. These bottles are thus firmly held in precisely, vertically upright position on the support units. When the loader mechanism 14 returns to the retracted position, the motor 100 is started either manually or by a sensing device to cause the step by step counter-clockwise oribiting of the conveyor 11. After each movement of a support unit 12 carrying a bottle from the position indicated at 12' to the position indicated at 12'', feed mechanism 168 will be operated. Operation of the feed mechanism takes place only when conveyor 11 is stationary between steps. It is understood, of course, that there will be at this time a series of base cups on the feed mechanism 168 and also a line of base cups on the track 140. The base cups on the track 140 will be advanced by the conveyor element 152 up to the feed mechanism 168 but then the advance of the line of base cups on track 140 will cease, even though the element 152 continues to move under them, because they will be blocked by the base cups on the feed mechanism. When the feed mechanism 168 is operated, piston-cylinder assembly 90 will first retract to the left in FIG. 10, causing dog 194 to cam over a lug 197, and then it will extend to advance the feed mechanism one step and transfer one base cup to the base cup seat 53 of the adjacent support unit 12. During the retraction of the rod of the piston-cylinder assembly 190, the glue dispenser will be actuated to deposit glue on the ring 25 in the bottom of the base cup before it is transferred.

Continued oribiting of the conveyor 11 causes the support units to pass over the cam rail 220 which raises the base cup seats 53 to apply the base cups to the bottoms of the bottles. The bottles are cammed away from the support units 12 by the cam rails 265 and 269 and pushed on to the track 240 where they are carried by the conveyor element 152 to a point where they may be collected or discharged.

I claim:

1. A machine for applying base cups to bottles, comprising a conveyor movable along a predetermined path and having a series of support units each comprising a bottle holder having means for holding a bottle securely and firmly in an upright position and a base cup seat for holding a base cup upright supported beneath said bottle holder for movement toward and away from the bottom of a bottle held by said bottle holder, means for loading bottles upright on said respective bottle holders, means for applying adhesive to the inside of said base cups, means for holding said base cups upright and with adhesive applied thereto on said respective base cup seats, and means downstream from said bottle and base cup loading means in the direction of conveyor movement for elevating said base cup seats to apply and adhere the base cups held thereby to the bottles while the bottles are held securely and firmly as aforesaid by the bottle holders thereabove.

2. A machine as defined in claim 1, wherein said means for elevating said base cup seats is operated automatically in response to the movement of said conveyor.

3. A machine as defined in claim 2, wherein said means for elevating said base cup seats comprises a cam rail engageable with said seats in sequence as they are moved along said path by said conveyor.

4. A machine as defined in claim 1, including means for conveying base cups to said base cup loading means and for conveying bottles with applied base cups away from conveyor, said conveyor means comprising a first track for supporting a line of base cups and leading generally toward said base cup loading means, said conveying means also comprising a second track adjacent said first track for supporting a line of bottles with applied base cups and leading generally away from said conveyor, and advancing means comprising an elongated flexible member having a first flight for moving such base cups along said first track in a direction toward said base cup loading means and having a return flight for moving such bottles with applied base cups along said second track in a direction away from said conveyor, said tracks having generally parallel track portions supported one above the other, said first flight of said flexible member extending along one track portion and said return flight extending along the other track portion.

5. A machine for applying base cups to bottles, comprising a conveyor movable along a predetermined path and having a series of support units each comprising a bottle holder for holding a bottle upright and a base cup seat for holding a base cup upright supported beneath said bottle holder for movement toward and away from the bottom of a bottle held by said bottle holder, each bottle holder comprising means engageable with the body of a bottle and means engageable with the neck of a bottle, said neck engaging means comprising a member having an open slot of generally U-shape for closely receiving the neck of a bottle, said member being of a flexible, compressible material capable of holding the neck of a bottle with a friction grip, means for loading bottles upright on said respective bottle holders, means for loading base cups upright on said respective base cup seats, and means downstream from said bottle and base cup loading means in the direction of conveyor movement for elevating said base cup seats to apply the base cups held thereby to the bottles held by the bottle holders thereabove.

6. A machine for applying base cups to bottles, comprising a conveyor movable along a predetermined path and having a series of support units each comprising a bottle holder for holding a bottle upright and a base cup seat for holding a base cup upright supported beneath said bottle holder for movement toward and away from the bottom of a bottle held by said bottle holder, each bottle holder comprising means engageable with a body of a bottle and means engageable with the neck of a bottle, said neck engaging means comprising a first member of relatively rigid material and a second member of a flexible, compressible, rubber-like material, said members having registering open slots of generally U-shape for closely receiving the neck of a bottle, the slot in said second member being adapted to hold the neck of a bottle with a friction grip and having neck retaining detents, means for loading bottles upright on said respective bottle holders, means for loading base cups upright on said respective base cup seats, and means downstream from said bottle and base cup loading means in the direction of conveyor movement for elevating said base cup seats to apply the base cups held thereby to the bottles held by the bottle holders thereabove.

7. A machine as defined in claim 6, wherein said first and second members are secured together in surface-to-surface contacting relation, said second member having a generally U-shaped recess in its surface contacting said first member to receive a collar on a bottle.

8. A machine as defined in claim 7, wherein said second member has laterally spaced legs on opposite sides of the entrance to the slot therein which are flared to facilitate the entry of the neck of a bottle.

9. A machine for applying base cups to bottles which have a body portion and a neck portion of reduced diameter relative to said body portion and are provided with a collar around said neck portion, comprising a conveyor movable along a predetermined path and having a series of support units each comprising a bottle holder for holding a bottle upright and a base cup seat for holding a base cup upright supported beneath said bottle holder for movement toward and away from the bottom of a bottle held by said bottle holder, each bottle holder comprising means engageable with the neck portion of the bottle, said neck engaging means comprising a member having an open slot of generally U-shape for closely receiving the neck portion of a bottle beneath its collar to suspend the bottle from its collar, means for loading bottles upright on said respective bottle holders with the neck portions of the bottle received in said slot as aforesaid, means for loading base cups upright on said respective base cup seats, and means downstream from said bottle and base cup loading means in the direction of conveyor movement for elevating said base cup seats to apply the base cups held thereby to the bottles held by the bottle holders thereabove.

* * * * *